July 18, 1967        J. P. CLYNE        3,331,952

BILLET MILL INDICATION SYSTEM

Filed Feb. 25, 1963        3 Sheets-Sheet 2

INVENTOR
J. P. Clyne
BY

ATTORNEY

United States Patent Office 3,331,952
Patented July 18, 1967

3,331,952
BILLET MILL INDICATION SYSTEM
John Peter Clyne, London, England, assignor to The British Iron and Steel Research Association
Filed Feb. 25, 1963, Ser. No. 260,604
11 Claims. (Cl. 235—151.11)

This invention relates to indication systems, particularly for billet mills. The invention also relates, although not exclusively, to control systems for billet mills.

In billet mills, it is desirable that the billets rolled from the blooms in the billet rolling mill should have predetermined weight per unit length. However, since in present-day mills the operator is not provided with a current indication of weight per unit length being rolled, no practicable measures can be taken in the operation of such mills to cut billets into lengths of prescribed weight and even less can the mill be controlled to roll billets to prescribed weight per unit length. The only possibility at present relies on visual inspection of a finished product to control subsequent products, this being susceptible to human error; or a sampling technique may be employed whereby a billet portion is cooled and weighed to assess weight per unit length, this being accurate but too time-consuming to cater for the rapid succession of interchange between soaking pits with or changes for other reasons, each successive change requiring renewed sampling.

It is for the above reasons that orders are mostly made by length.

A further disadvantage of the present-day billet mills is the inability to control automatically the cutting of a billet so as to avoid waste, or the production of too long or too short sections, when billets are being cut.

One object of the present invention is to provide improved indication systems for billet mills whereby at least one or more of the above difficulties may be reduced.

In accordance with one aspect of the present invention, there is provided in or for a billet mill the combination of means for weighing a hot bloom or billet, means for measuring the length of a hot billet as it leaves the mill, and means for providing an indication of weight per unit length of a billet.

In another aspect there is provided in or for a billet mill the combination of means for measuring the length of a hot billet as it leaves the mill, and means for converting the hot billet length measurement to an indication of the corresponding length of the billet when cold. This indication assists the mill operator and sawman to control the mill and associated saws to produce required weight per cold unit length and required section lengths.

Thus, by the above aspects of the invention a measurement of hot billet length may be applied to a calculator, together with a signal representing the bloom weight, the calculator operating to indicate the weight per cold unit length and the cold billet length. The percentage contraction between hot length and cold length will vary with the type of steel being processed and the "hot" temperature, which varies mainly from the use of a plurality of soaking pits having different characteristics, and facilities will be provided for instructing the calculator as to what will be termed contraction factors. The indication of weight per cold unit length can then be used to demonstrate to the mill operative any departure from the required value, with the result that the operator can make appropriate adjustment to the mill screw setting. Alternatively, the calculator may provide a suitable signal representing the departure from required weight per unit length for automatic mill control.

Again, the indications of hot and cold billet lengths may be employed by the calculator together with appropriate instructions regarding required billet section lengths to automatically control setting of the saw stops.

In order that the invention may be clearly understood in its various aspects and forms, the same will now be more fully described, by way of example, with reference to the accompanying drawings, in which.

Figure 1:
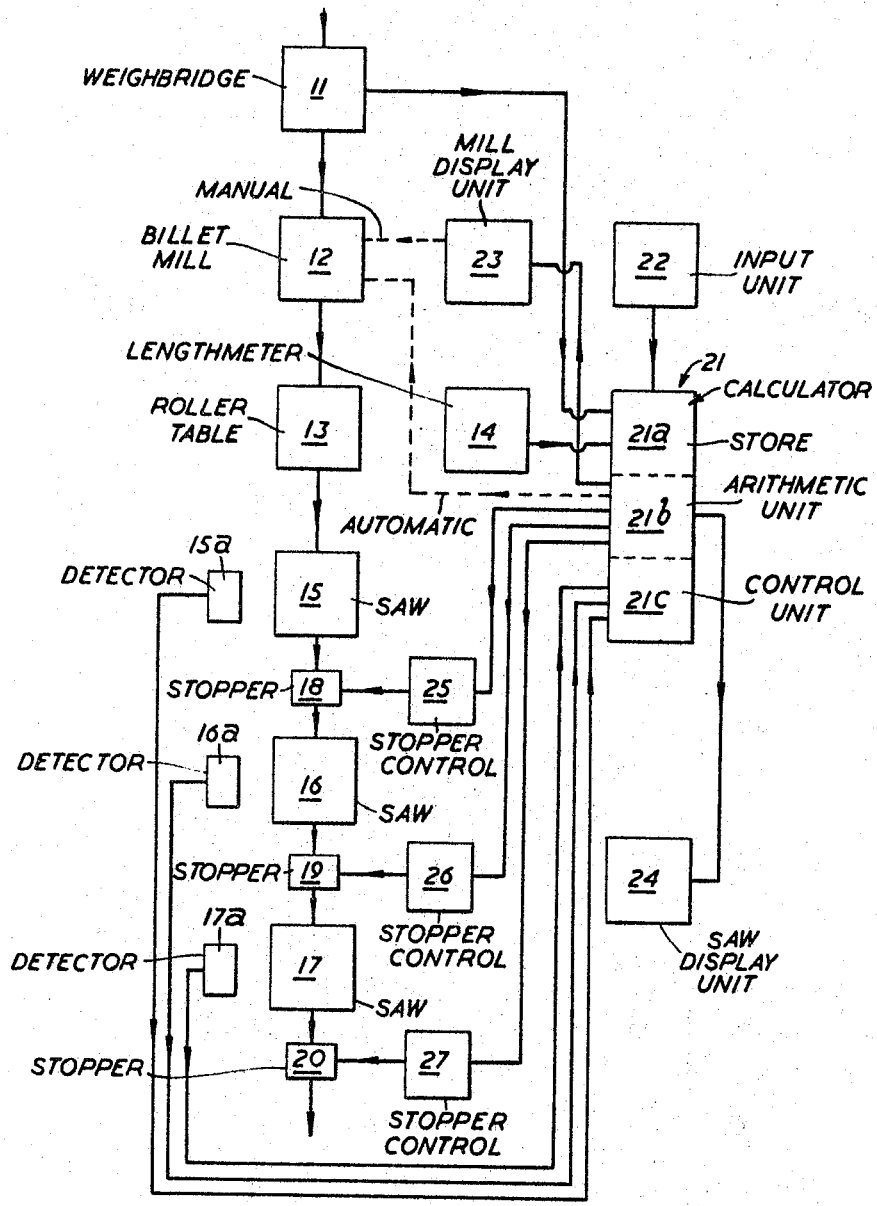
FIGURE 1 is a block schematic illustration of a billet mill according to the invention.

In the arrangement of FIGURE 1, a cropped bloom is weighed by a weighbridge 11 before entry to the rolling mill 12 and the resulting hot rolled billet is passed from the mill on to a roller table 13 where the billet length is measured by lengthmeter 14. Thereafter, the billet is sawn to appropriate section lengths by means of three saws 15, 16, 17 arranged in series with respectively associated adjustable billet stoppers 18, 19, 20.

A calculator 21 is responsive to input information signals from the weighbridge and lengthmeter and is employed together with additional information, such as contraction factors, from an input unit 22 to provide appropriate indications as to weight and length at mill display unit 23 and saw display unit 24. Calculator 21 is also arranged to automatically control the positioning of saw stoppers 18, 19, 20 via individual position control servo-systems 25, 26, 27 on the basis of weight and length indications together with additional instructions supplied by the sawman through input unit 22.

Also, the calculator will require storage facilities of different order for information relevant to an overall mill operation, and individual billets, apart from any shorter time storage which is necessary to individual computations with a single billet.

The calculator is in fact shown to have three basic component parts, namely, a store 21a, an arithmetic unit 21b, and a control unit 21c. In the input information applied to the calculator from input unit 22 and to be retained during a complete operation will be:

(a) The ratio of billet to bloom weight, which allows for the small loss from scale.

(b) The width of the saws (or other forms of cutters).

(c) The size of normal discard, assumed constant.

(d) The contraction factor.

Input information relating to individual billets will be:

(e) The measured billet (hot) length.

(f) The measured bloom weight. It will be noted that this measure is obtained in advance of associated billet length, and thus requires storage pending association with the relevant length measurement.

(g) The sawman's instructions, these including information as to required weights or lengths.

In operation of the calculator the arithmetic unit divides the hot length by the assumed contraction factors to give the cold length. The bloom weight is then divided by the correction factor for scale loss to give billet weight, and this is in turn divided by the cold length to give weight per cold unit length. It will be appreciated that this calculation is independent of errors in estimating the length of discard, since it is based on hot length measurement prior to any cutting. The arithmetic unit then calculates the required position of the saw stoppers relative to hot billet length on the basis of the sawman's instructions and the information associating weight and hot and cold length.

The control unit will exercise an overriding control in operation, whereby the normal mode of working can be altered. Thus if saw stopper positions for a billet have been calculated but one saw is still cutting the previous billet, this condition will be signalled to the control unit which operates to delay transmission of the new position control information to that saw until the previous billet is cleared. This latter control will be responsive to individual hot metal detectors at each saw station as indicated at 15a, 16a, 17a, each of which detectors effectively provides a two-state signal representing presence and absence of a billet.

The control unit will also comprise "repeat" or "cancel" facilities. The first of these facilities causes all calculated information concerning the billet about to be cut to be ignored and the billet length data and weight per unit length for the previous billet to be repeated at the display units. This is appropriate to the instance where a billet is badly buckled but has a usable portion which would then be cut to the same lengths as the previous billet. The "cancel" feature allows for complete cancellation of data relating to a particular billet and appropriate advance of succeeding information in the rare event of a billet being removed from the mill.

A further facility which may be advantageously associated with the calculator is a printer for recording the weight and weight per unit length of billet sections cut.

In the display units, an indication of billet weight per cold unit length is presented to the mill operator at unit 23; and indications of the net cold length, that is, after subtraction of total discard length, and billet weight are presented to the sawman at unit 24.

Considering the weighbridge 11 and the lengthmeter 14 of FIGURE 1, the weighbridge may be of any suitable known form and although shown as preceding the mill to measure bloom weight it may, if desired, follow the mill. While the lengthmeter may also be of any suitable form, it is preferred to employ equipment of the form comprising a sequence of photocells since such equipment, as recently developed is capable of measuring the length of a moving billet with an accuracy compatible with that of the weighing function.

It will be appreciated that several billets will be undergoing rolling between weighing and length measuring operations, and calculator 21 will accordingly store weight input signals in sequence for association with the corresponding length input signals.

Considering now the operation of the position control servomechanisms which individually control the saw stoppers, these normally act to stop the billet or parts thereof so that cutting is executed in what is termed a 3:1:1 ratio since this ensures that three saws in series are worked equally. Thus if the sawman instructs cutting into 10 feet lengths, for example, the first saw stopper will stop the billet in a position such that the first saw cuts off a 30 foot length. This last length then passes to the second saw, the stopper of which stops the length in a position such that the saw cuts the 30 foot length into a 10 foot and a 20 foot length. The first of these last two lengths will pass through the third saw station and the second of such lengths will be stopped in an appropriate position for halving by the third saw into two ten feet lengths which are then passed on.

However, while the above 3:1:1 ratio is, in many respects, an optimum mode of operation for three saws in series other ratios may be appropriate for different circumstances. Thus withdrawal of a saw for maintenance or as a result of a mishap may be taken into account by use of a different mode of working.

In calculating the required stopper positions, account will be taken by the calculator of the width of the saws this information being fed to the store 21a by the input unit on appropriate instructions.

Figure 2:
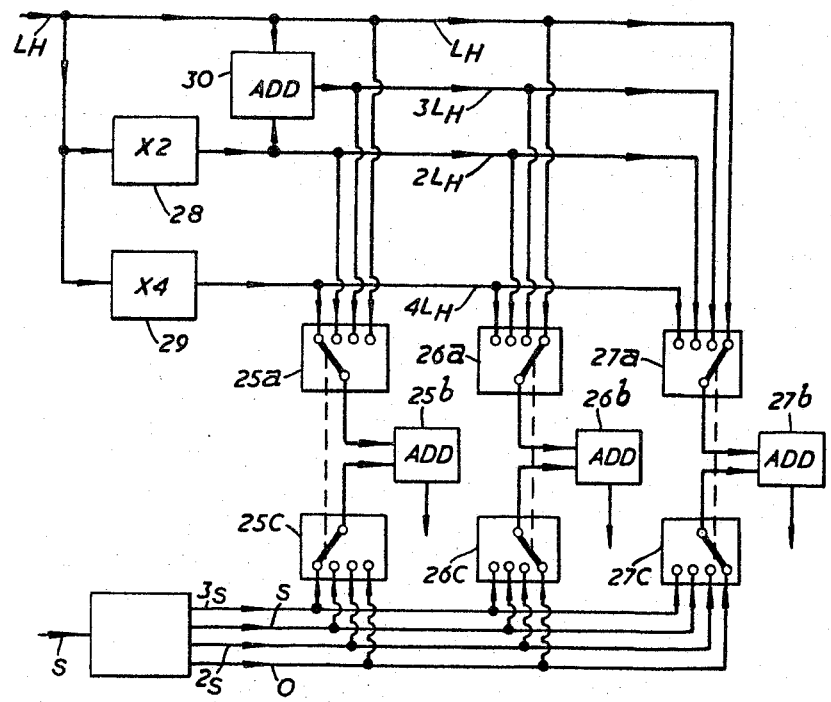
FIGURE 2 illustrates in more detail that part of the calculator of FIGURE 1 for controlling the saw stopper positions.

FIGURE 2 illustrates in more detail that part of the calculator which instructs the saw stopper position control servomechanisms. In this figure, a signal representing the hot length $L_H$ calculated to contract to the required cold length is fed in parallel to multipliers 28 and 29 which respectively produce output signals representing $2L_H$ and $4L_H$. The output signal from multiples 28 is applied, together with the initial input signal, to an adder 30 to produce a further signal representing $3L_H$. There are then four signals available which represent $L_H$, $2L_H$, $3L_H$ and $4L_H$ and there are applied in parallel to selector switches 25a, 26a, 27a respectively associated with servomechanisms 25, 26, 27 whereby the appropriate multiples of length $L_H$ to be cut are selectively applied to respectively associated adders 25b, 26b, 27b. The setting of switches 25a, 26a, 27a will be effected in response to the sawman's instructions by manual control at unit 22.

Further input signals are applied to adders 25b, 26b, 27b through associated switches 25c, 26c, 27c, operated synchronously with switches 25a, 26a, 27a to select the appropriate one of four parallel input signals representing $(r-l)s$, where $s$ indicates saw width and $r$ equals 1, 2, 3 or 4 as the first selected input is $L_H$, $2L_H$, $3L_H$ or $4L_H$. Thus, the output signals from the individual adders 25c, 26c, 27c which act as command signals for their associated servomechanisms will be of the form:

$$r \cdot L_H + (r-l)s = r(L_H+s) - s$$

In the above example of a 3:1:1 ratio the stopper control command signals will be: $3L_H+2s$, $L_H$ and $L_H$ for the first, second and third saw stoppers, respectively, so that account is taken at the first cut of the loss in length of $2s$ which occurs by virtue of the width of saws in the two following cuts.

Although not shown in FIGURE 2, generation of the saw width correction factors, $2s$ and $3s$ will be derived in similar manner to $2L_H$ and $3L_H$ by use of a multiplier and adder in the calculator 21, and appropriate representations of $s$, $2s$ and $3s$ stored for use as required.

The above-described mode of operation is appropriate to fixed length orders and equally well to fixed weight orders, these being the same in any event when weight per cold unit length is controlled to a prescribed value. However, it is common for orders to be placed in terms of so-called random lengths where the cut billet sections may be of any length within a range having specified minimum and maximum values.

Figure 3:
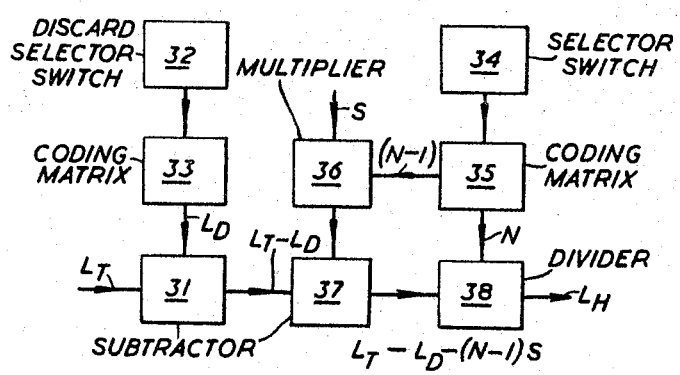
FIGURE 3 illustrates in more detail a part of the calculator of FIGURE 1 associated with FIGURE 2 in a particular billet cutting operation.

FIGURE 3 illustrates functionally the part of the calculator for determining the hot length of equal length billet sections on the basis of instructions from the sawman as to the number of lengths into which a billet is to be cut following his consideration of the cold length indication presented at the display unit 24.

In FIGURE 3 a signal representing total hot length $L_T$ is applied to a subtractor 31 together with a signal representing the selected discard $L_D$ set by the sawman at selector switch 32 and coded into digital form by coding matrix 33. The sawman also selects the number, N, of equal length pieces to be cut at selector switch 34 and a digitally coded signal representation of number N is produced by coding matrix 35 under control of switch 34. Matrix 35 also produces a representation of $(N-l)$ which is supplied to a multiplier 36 together with a representation of saw width $s$. The resultant output $(N-l)s$ from multiplier 36 is fed to a substractor 37 with the output $(L_T-L_D)$ from subtractor 31 to provide a representation of the integral length of the sections which will be cut, taking account of discard and saw cut loss, that is, $$L_T - L_D - (N-1)s$$

This last signal is applied with N output signal from matrix 35 to a divider 38 the output of which represents the appropriate signal $L_H$ to be applied as input to the arrangement of FIGURE 2 for automatic saw stopper positioning.

Figure 4:
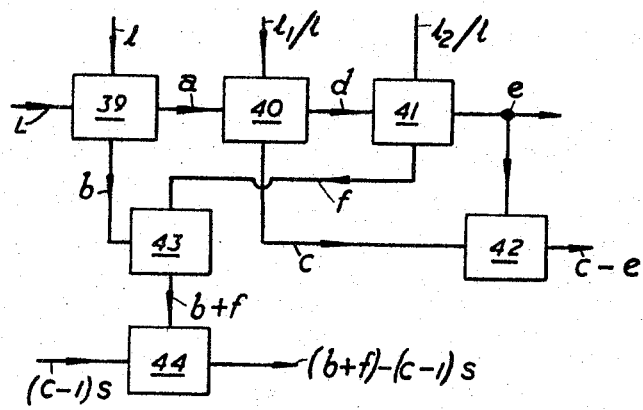
FIGURE 4 illustrates in more detail yet another part of the calculator of FIGURE 1 associated with FIGURE 2 in a further billet cutting operation.

Another common order is termed "multiple lengths" in which required lengths lie between specified limits and are multiples of a basic unit length. There will commonly be two lengths differing in length by one basic unit in such an order, such as, for example, 10 or 11 multiples of 1 foot whereby 10 or 11 foot lengths are acceptable. FIGURE 4 illustrates a part of the calculator for determining the numbers of each one of two lengths in a multiple length order which can be cut from a billet of given length with minimum wastage.

In FIGURE 4 a signal representing the total billet cold length L is applied as dividend input to a divider 39 together with a divisor input signal representing the basic unit length $l$ for the required multiple lengths in question, these being denoted as $l_1$ and $(l_1+l_2)$ where $l_1 > l_2$ since this will almost invariably be the case in practice. Operation of divider 39 will provide output signals, as indicated, representing a quotient $a$ and remainder $b$. The quotient output $a$ is applied as divisor to a second divider 40 to which a signal representing $l_1/l$ is applied as dividend to provide respective quotient and remainder signals $c$ and $d$. The remainder signal $d$ is then applied as divisor to a third divider 41 for which the dividend input signal represents $l_2/l_1$, to produce respective quotient and remainder signals $e$ and $f$.

Finally, quotient signals $c$ and $e$ are fed to a subtractor 42 providing an output signal representing $(c-e)$, and it will be seen that the billet can be cut, with minimum wastage into $(c-e)$ pieces of length $l_1$ and $e$ pieces of length $(l_1+l_2)$. Signals denoting these required number of pieces are readily available.

Also, the remainder signals $b$ and $f$ are applied to an adder 43, the output of which is applied to a subtractor 44 the other input of which represents $(c-l)s$, where $s$ equals saw width. The output from subtractor 44 represents $(b+e)-(c-l)s$, that is, the discard.

Clearly, the arrangement of FIGURE 4 can be employed equally well for calculation of optimum cutting for multiple weight orders.

Turning now to the control of the mill to provide a billet of predetermined weight per unit length, this may be effected by the mill operator following comparison of the actual weight per unit length of the leading billet with that required. Thus, the mill operator may be provided with appropriate data indicating the necessary alteration of mill screwdown for various departures of the weight per unit length from the required value. Since this may involve incorrect weight per unit length on the first billet rolled from each batch of blooms, it may be preferred that an indication of weight per unit length be supplied to the mill operator after a rolling pass just before the last pass for the leading billet whereby the operator can assess the screwdown required on the last pass to provide the desired weight per unit length.

Clearly, the arrangement of FIGURE 4 can be employed equally well for calculation of optimum cutting for multiple weight orders.

Turning now to the control of the mill to provide a billet of predetermined weight per unit length, this may be effected by the mill operator following comparison of the actual weight per unit length of the leading billet with that required. Thus, the mill operator may be provided with appropriate data indicating the necesary alteration of mill screwdown for various departures of the weight per unit length from the required value. Since this may involve incorrect weight per unit length on the first billet rolled from each batch of blooms, it may be preferred that an indication of weight per unit length be supplied to the mill operator after a rolling pass just before the last pass for the leading billet whereby the operator can assess the screwdown required on the last pass to provide the desired weight per unit length.

The above control by the mill operator is indicated by a broken line connection between mill display unit 23 and the mill 12 in FIGURE 1, and is marked MANUAL for identification.

This screwdown control operation may equally well be effected by use of a signal from the calculator, dependent on the departure of the actual weight per unit length from the required value, and representing the screwdown adjustment to be made to obtain the required weight per unit length. This signal can thus be applied directly to the mill for automatic screwdown control, and is indicated by a broken line connection marked AUTOMATIC between calculator 21 and mill 12 in FIGURE 1.

As will be appreciated the system as described above has a number of advantages, for example:

(1) Very close tolerances on weight per unit length may be readily held, with virtually instantaneous display of the weight per unit cold length of the billet.

(2) Efficiency in the cutting of the billet is achieved; the billet may be sawn in the hot state to the cold lengths dictated by the sawman.

(3) Accurate positioning of the saw stops is achieved regardless of the observation point of the sawman.

(4) Movement of the saw stoppers to the required positions commences while the billet is still moving on the roller table, thereby producing a saving of time which is useful in view of the relatively slow adjustment speed of conventional stoppers.

(5) When the billet is cut into a number of equal lengths, for minimum wastage under a random lengths order, say, identification of sections is facilitated since all sections from a given billet will have the same length which will probably be unique within the order in question.

I claim:

1. A control system for a billet mill, said system comprising means for weighing a hot bloom or billet, means for measuring the length of a hot billet as it leaves the mill, means for converting the length measurement to an indication of the corresponding length of the billet when cold, and means for providing an indication of weight per unit length of the billet when cold, and means for generating an electrical signal dependent on the departure of the indication of the weight per unit length of a billet when cold from a predetermined value, whereby the mill may be controlled to roll billets having weight per unit length when cold substantially equal to said predetermined value.

2. A control system according to claim 1 comprising means for automatically controlling the mill in response to said electrical signal.

3. A control system for a billet mill equipped with at least one cutting station including a cutter and an associated stopper adapted for relative adjustment to determine the length of a section to be cut from a hot billet, said control system comprising means for weighing a hot bloom or billet, means for measuring the length of a hot billet as it leaves the mill, means for converting the length measurement to an indication of the corresponding length of the billet when cold, and means for providing an indication of weight per unit length of the billet when cold, means responsive to an instruction representing the length of a section, when cold, to be cut from the billet for generating an electrical signal representing the corresponding length of the section to be cut from the hot billet, and means responsive to said signal for controlling relative adjustment between said cutter and stopper.

4. A control system for a billet mill equipped with a number of billet cutting stations arranged in series and each including a cutter and associated stopper adapted for relative adjustment to determine the lengths of sections to be cut from a hot billet, said control system comprising means for weighing a hot bloom or billet, means for measuring the length of a hot billet as it leaves the mill, means for converting the length measurement to an indication of the corresponding length of the billet when cold, and means for providing an indication of weight per unit length of the billet when cold, means responsive to instructions representing a common length, when cold, to be cut from the billet for generating an electrical signal representing the corresponding length of the section to be cut from the hot billet, means responsive to said signal for producing further electrical signals representing integral multiples of said corresponding length, and individual means associated with each cutting station responsive to a selected one of said signals and further signals for controlling relative adjustment between the relevant cutter and stopper.

5. A control system according to claim 4 wherein the relative adjustment means of the cutting station first in the series is responsive to a further signal representing $n$ times said corresponding length where $n$ is the number of stations in the series, and the relative adjustment means of the cutting station last in the series is responsive to the signal representing said corresponding length.

6. A control system according to claim 5 wherein the series of cutting stations comprises three stations, and the relative adjustment means of the middle stations, is responsive to the signal representing said corresponding length.

7. A control system according to claim 4 wherein each cutter has substantially the same effective width, comprising means for selectively modifying the electrical signal applied to each relative adjustment, before such application, to add a signal component representing $n$ times the effective cutter width where $n$ equals the number of subsequent cutting operations to be made on a section cut by the station in question.

8. A control system according to claim 3 wherein each cutting station includes a saw as cutter.

9. A control system for a billet mill comprising means for weighing a hot bloom or billet, means for measuring the length of a hot billet as it leaves the mill, means for converting the length measurement to an indication of the corresponding length of the billet when cold, and means for providing an indication of weight per unit length of the billet when cold, means for generating an electrical signal representing a selected length of billet to be discarded during cutting, subtractor means for subtracting the discard length signal from an electrical signal representing the length of the hot billet, means for generating an electrical signal representing a selected number $N$ of equal length sections into which the billet is to be cut, and divider means responsive to the output of said subtractor as dividend input and to said $N$ signal as divisor input to produce a quotient output signal representing the length of the equal length sections to be cut from the billet.

10. A control system according to claim 9 comprising means for generating an electrical signal representing $(N-l)$ times the effective width of a cutter to be employed in cutting the billet, and a second subtractor means responsive to the first-mentioned subtractor output and said $(N-l)$ cutter width signal as inputs and having its output connected as dividend input to said divider.

11. A control system for a billet mill comprising means for weighing a hot bloom or billet, means for measuring the length of a hot billet as it leaves the mill, means for converting the length measurement to an indication of the corresponding length of the billet when cold, and means for providing an indication of weight per unit length of the billet when cold, first divider means responsive to an electrical signal representing the length of a billet when cold as dividend input and to an electrical signal representing a first billet section length $l_1$, second divider means responsive to the remainder output of said first divider as dividend input and to an electrical signal representing $l_2$ where $(l_1+l_2)$ is a second billet section length and $l_1>l_2$, and substractor means responsive to the quotient outputs of said first and second dividers as inputs, whereby the subtractor output and the quotient output of said second divider respectively represent the numbers of sections of said first and second billet section lengths which can be cut from the billet in question with effectively minimum wastage.

References Cited

UNITED STATES PATENTS

| | | | |
|---|---|---|---|
| 3,163,065 | 12/1964 | Kolodgy et al. | 83—72 |
| 3,175,438 | 3/1965 | Johnson | 235—151.33 |

MALCOLM A. MORRISON, *Primary Examiner.*

A. J. SARLI, J. F. RUGGIERO, *Assistant Examiners.*